May 16, 1967 E. J. JONES 3,320,569
SHEAR LOAD CELL
Filed Feb. 17, 1965 2 Sheets-Sheet 1
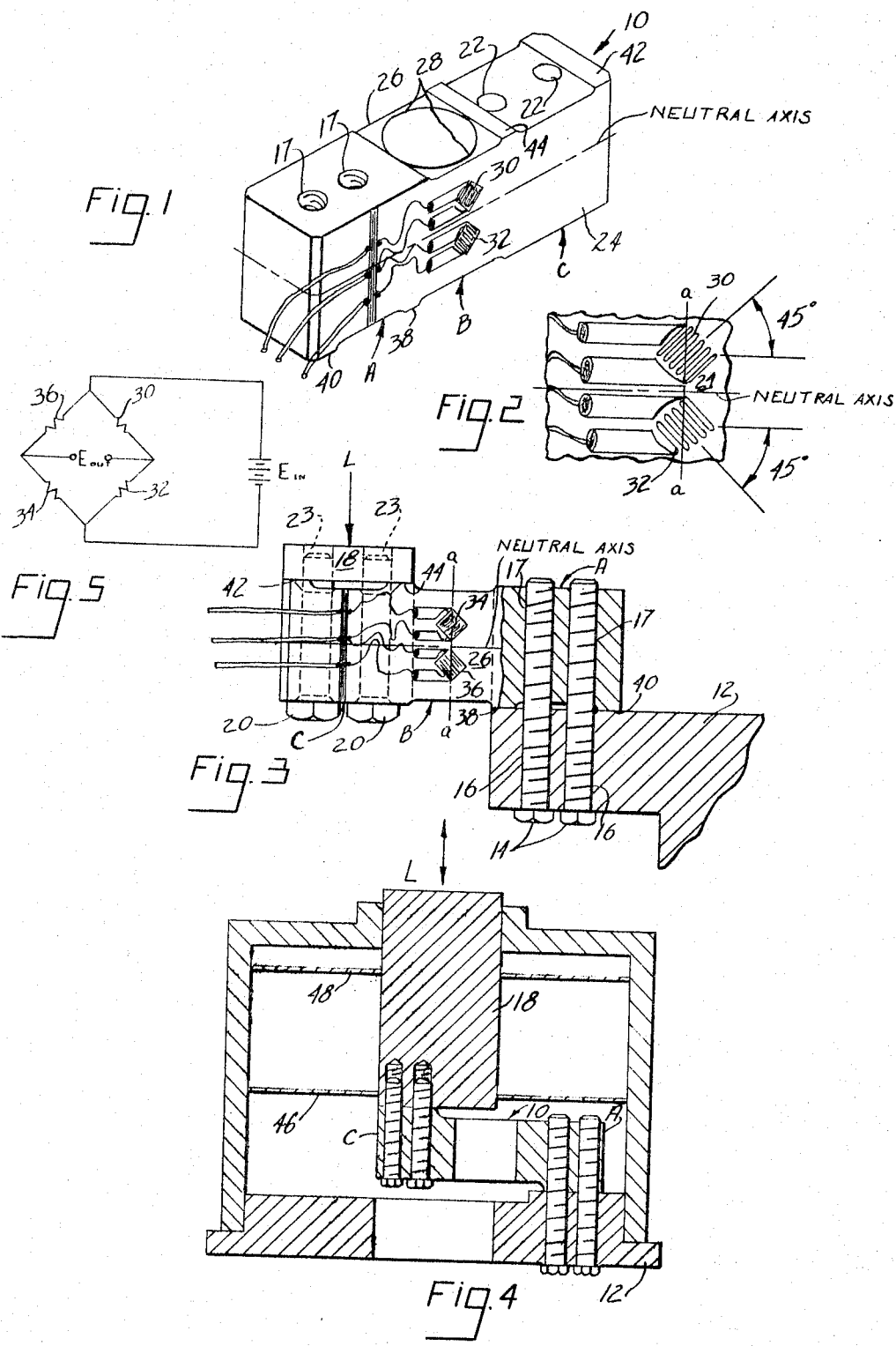

May 16, 1967  E. J. JONES  3,320,569
SHEAR LOAD CELL
Filed Feb. 17, 1965  2 Sheets-Sheet 2
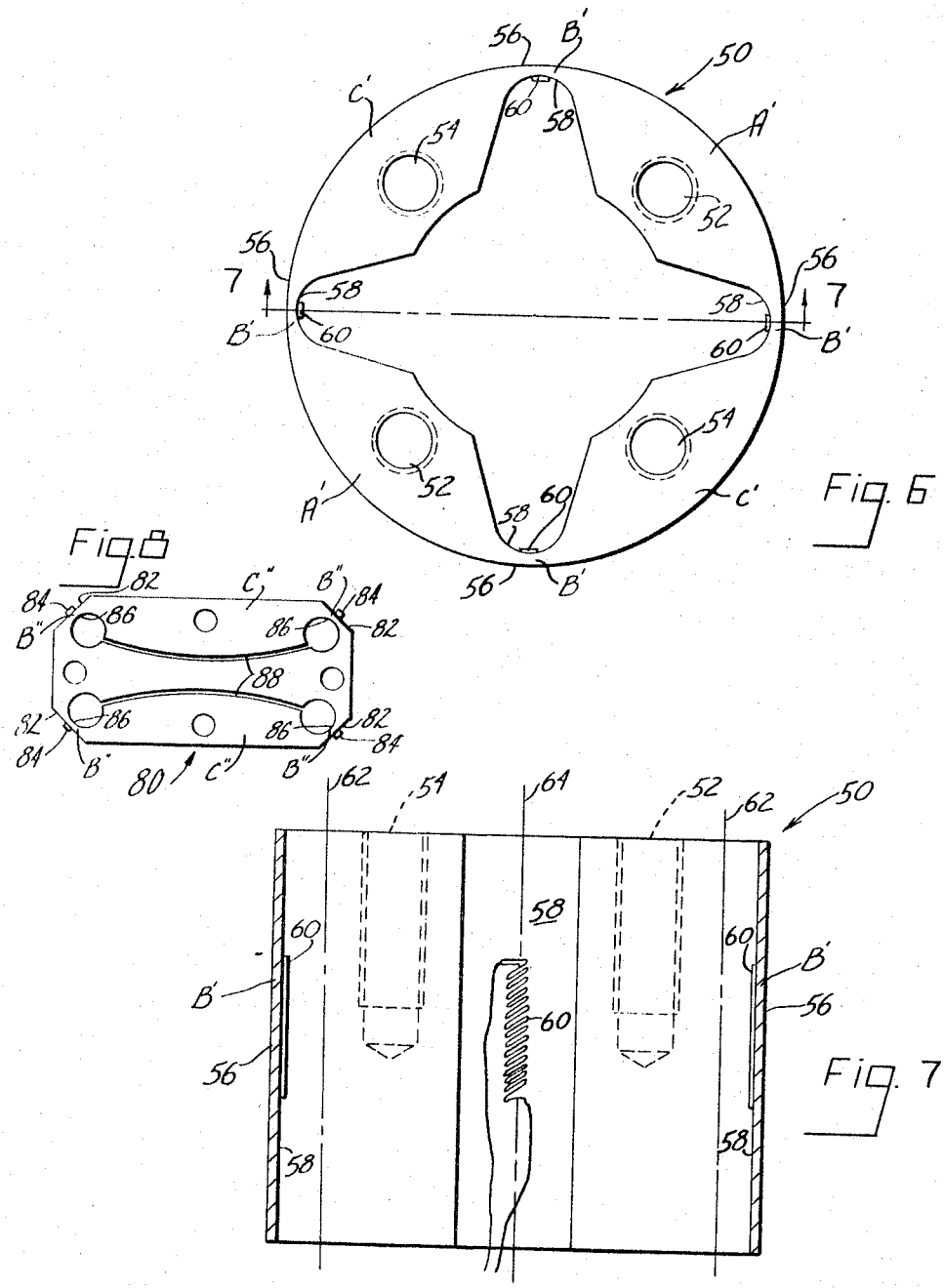

United States Patent Office 3,320,569
Patented May 16, 1967

3,320,569
SHEAR LOAD CELL
Edgar J. Jones, Weston, Mass., assignor to Instron Corporation, Canton, Mass., a corporation of Massachusetts
Filed Feb. 17, 1965, Ser. No. 433,351
12 Claims. (Cl. 338—5)

This invention relates to load cells, and more particularly to such devices in which strain gauges provide a signal responsive to forces, in the load cells, in shear. (Cf. Pien United States Patent No. 3,037,178, May 29, 1962).

A primary object of the invention is to provide load cells that are not only simple in construction, but as well provide both great linearity in use and small deflection load ratios.

The invention features in its broadest aspect provision of a load cell embodying a cell unit with loading portions and support portions separated by thinner intermediate gauging portions, the latter including gauging surfaces defined by lines parallel to the axis of load and extending for the full height of the load cell unit.

Other objects, advantages, and features will appear from the following description of preferred embodiments, taken together with the attached drawings thereof, in which:

FIG. 1 is a perspective view of a shear load cell unit embodying the present invention;

FIG. 2 is an enlarged view of a portion of the unit of FIG. 1 illustrating the location of the strain gauges thereon;

FIG. 3 is a side elevation, partially in section, illustrating somewhat diagrammatically mounting, and applying a load to, the unit of FIG. 1 (the unit being turned around from its position in FIG. 1 to better illustrate strain gauge placement);

FIG. 4 is a vertical section through a load cell incorporating said unit;

FIG. 5 is a circuit diagram illustrating a measuring bridge whose arms include the strain gauges bonded to the unit of FIG. 1;

FIG. 6 is a plan view of a modified embodiment of the invention;

FIG. 7 is a sectional view at 7—7 of FIG. 6; and

FIG. 8 is a diagrammatic plan view of another embodiment of the invention.

Referring now to the drawings in more detail, FIGS. 1 and 3 illustrate a preferred cantilever beam-type embodiment of the invention. A short relatively high cantilever beam 10 comprising, integrally, a supporting portion A, gauging portion B and loading portion C, is secured to a fixed support 12 by a pair of bolts 14 extending upward through a pair of vertical holes 16 in support 12 into threaded holes 17 in supporting portion A. A vertical load L is applied to loading portion C. As illustrated, the member 18 through which load L is applied is bolted to loading portion C by bolts 20 extending upward through vertical holes 22 in the loading portion into threaded holes 23 in member 18. Gauging portion B comprises planar parallel vertical shear surfaces 24 and 26, defined by the parallel opposite vertical side faces of beam 10, as well as cylindrical shear surfaces defined by the portions of the cylindrical surface (formed by central hole 28 drilled vertically through the center of the beam with the axis parallel to surfaces 24 and 26) opposite surfaces 24 and 26. Strain gauges 30 and 32 are bonded to shear surface 24 and gauges 34 and 36 to shear surface 26. Placement thus of the strain gauges minimizes any effect on linearity of any bending strains that, in practical use deviation from the theoretical ideal in this cantilever embodiment, appear at the strain gauges along with the desired strains in shear.

The strain gauges are placed closely adjacent the neutral axis of the beam, at equal distances above and below the neutral axis of the beam (where the bending stresses are equal and opposite) with the gauge filaments of each gauge extending at 45° angles (perpendicular to the other gauge) to the neutral axis of the beam and the vertical diagonal axis $aa$ of each gauge lying in a plane perpendicular to the shear surfaces and including the central axis of hole 28. The gauges are wired into a measuring bridge, as shown in FIG. 5, with the compressive gauges (gauges 32 and 36, which are below the neutral plane) in two opposing arms of the bridge and the tension gauges (gauges 30 and 34, which are above the neutral plane) in two adjacent opposing arms.

As shown in FIG. 3, beam 10 features a pair of parallel transverse support ridges 38 and 40 on the lower surface of support portion A and a similar pair of loading ridges 42 and 44 on the upper surface of loading portion C. These novel ridges aid in keeping the length of the effective "lever arm" of the beam constant, with further benefit to linearity. The raised surfaces of ridges 38 and 40 lie in a plane perpendicular to the applied load and, as illustrated in FIG. 3, are adapted for engaging the adjacent surface of support 12. The raised surfaces of loading ridges 42 and 44 are adapted for engaging the member 18 through which the load is applied to the beam. All the ridges are made as thin as possible (without seriously scarring in use the adjacent surface) so that the external forces, in effect, are applied to beam 10 through a pair of fixed parallel lines rather than over a large surface, thereby eliminating the non-linearities that would be caused if the point of contact shifted from point to point (and large surfaces cannot practically be made optically planar). The bolts which secure the beam to support 12 and which secure the loading member 18 to the beam are located closely adjacent the transverse support ridges. Although it is possible to secure the beam and the load by means of a single bolt passing through the center of the loading and support portions respectively, a single bolt mounting tends to bend the portion of the beam intermediate the pair of ridges and cause undesirable secondary stresses in the beam. I have found that these stresses are eliminated in large measure by using a two-bolt system in which at least one of each pair of the bolts is mounted as close as possible to the transverse ridges.

The loading member 18 may suitably be carried for axial movement by a pair of diaphragms 46 and 48, illustrated diagrammatically in FIG. 4, as is well known in the art.

FIGS. 6 and 7 illustrate an alternative embodiment of the present invention. The unit, designated 50, comprises a hollow member of cylindrical exterior, with a plurality of circumferentially spaced support portion A'; loading portions C'; and thinner intermediate gauging portions B'. The support and loading portions each include a tapped hole (52 or 54 respectively) for securing the load cell to adjacent loading and support members. Each gauging portion B' includes a pair of shear faces 56 and 58, faces 56 being defined by portions of the external surface of the cylindrical member and each of faces 58 being defined by portions of the cylindrical surfaces formed by a hole drilled vertically through the load cell with its axis 62 parallel with the axis 64 of the cylindrical member. A resistance strain gauge 60 is bonded to each of faces 58 with its strain sensitive filaments lying at a 45° angle to axes 62 and 64. As the strains in alternate gauging portions are in opposite directions, all gauges are mounted with their filaments pointing in the same direction.

In effect, load cell 50 comprises a plurality of cantilever beams, similar to that of load cell 10, which have been wrapped into an annulus.

Load units 10 and 50 both obtain the desired low deflection-to-strain ratio by providing a thick member with thin gauging portions. Since the deflection of a cantilever beam varies directly with the cube of its length, inversely with the cube of its height, and inversely with its width, its deflection will be best minimized by decreasing length and increasing height. Shear strain varies inversely with height and width. The lowest deflection-to-strain ratio is obtained by maximizing height and minimizing width, i.e., by removing vertical, as opposed to horizontal, portions of the beam, to provide one or more shear surfaces on at least certain of which the strain gauges are mounted.

Another embodiment of the invention is shown diagrammatically in FIG. 8. This embodiment, indicated generally at 80, includes two support portions A", four gauging portions B", and two loading portions C". The shear surfaces 82, on which are mounted strain gauges 84, are vertically extending exterior surfaces. The inner shear surfaces 86 are defined by portions of vertical holes opposite the surfaces 82. Saw cuts 88 extending vertically through the element connect the pairs of vertical holes just referred to, as shown. Here again we find, moving generally around peripheries of the embodiment, loading portions alternating with support portions, and being separated around said peripheries by gauging portions.

Other embodiments within the appended claims will occur to those skilled in the art.

I claim:

1. A shear load cell for measuring the magnitude of an applied load comprising, in combination:
 a cell member including, integrally, a loading portion, a support portion, and a thinner intermediate gauging portion,
 said loading portion and said support portion including, respectively, a longitudinally spaced loading area and a parallel support area,
 said gauging portion including at least a pair of shear surfaces perpendicular to said areas and extending the height of said cell member, at least one of said shear surfaces being defined by portions of the external surface of said cell member, and
 a strain gauge bonded to one of said shear surfaces and oriented to measure strains in shear in said gauging portion.

2. A shear load cell for measuring the magnitude of an applied load comprising, in combination:
 a cell member with, integrally, a loading portion, a support portion, and a thinner intermediate gauging portion,
 said loading portion and said support portion including, respectively, a longitudinally spaced loading area and a parallel support area,
 said gauging portion including a pair of shear surfaces perpendicular to said areas, one of said shear surfaces being defined by portions of the external surface of said cell member and the other of said shear surfaces being defined by a portion of a cavity extending through said cell member with the central axis of said cavity perpendicular to said areas, and
 a strain gauge bonded to one of said shear surfaces and oriented to measure strains in shear in said gauging portion.

3. A shear load cell for measuring the magnitude of an applied load comprising, in combination:
 a cantilever beam with, integrally, a loading portion, a support portion and a thinner intermediate gauging portion,
 said loading portion and support portion including respectively a loading area and a parallel longitudinally spaced support area,
 said gauging portion including a pair of planar shear surfaces defined by portions of external opposite surfaces of said beam perpendicular to said areas, and
 a strain gauge bonded to each of the shear surfaces, each said gauge being oriented to measure strains in shear in said gauging portion.

4. A shear load cell for measuring the magnitude of an applied load comprising, in combination:
 a cantilever beam with, integrally, a loading portion, a support portion and a thinner intermediate gauging portion,
 said loading portion and support portion including respectively a loading area and a parallel longitudinally spaced support area,
 said gauging portion including a pair of planar shear surfaces defined by portions of external opposite surfaces of said beam, perpendicular to said areas,
 a substantially cylindrical cavity extending through said gauging portion intermediate the shear surfaces with the central axis of said cavity perpendicular to said areas, and
 a strain gauge bonded to each of the shear surfaces, each said gauge being oriented to measure strains in shear in said gauging portion.

5. A shear load cell for measuring the magnitude of an applied load comprising, in combination:
 a cantilever beam with, integrally, a loading portion, a support portion and a thinner intermediate gauging portion,
 said loading portion and support portion including respectively a loading area and a parallel longitudinally spaced support area,
 said gauging portion including a pair of planar shear surfaces defined by portions of external opposite surfaces of said beam, perpendicular to said areas,
 a substantially cylindrical cavity extending through said gauging portion intermediate the shear surfaces with with the central axis of said cavity perpendicular to said areas, and
 a pair of strain gauges bonded to each of the shear surfaces at equal distances above and below the neutral axis of the beam, each said gauge being oriented to measure strains in shear in said gauging portion.

6. A shear load cell for measuring the magnitude of an applied load comprising, in combination:
 a cantilever beam with, integrally, a loading portion, a support portion and a thinner intermediate gauging portion,
 said loading portion and support portion including respectively a loading area and a parallel longitudinally spaced support area,
 said gauging portion including a pair of planar shear surfaces defined by portions of external opposite surfaces of said beam, perpendicular to said areas,
 a substantially cylindrical cavity extending through said gauging portion intermediate the shear surfaces with the central axis of said cavity perpendicular to said areas, and
 a pair of strain gauges having strain sensitive resistance filaments bonded to each of the shear surfaces at equal distances above and below the neutral axis of the beam with said filaments of one of the pair at a 45° angle to the neutral axis of the beam and perpendicular to said filaments of the other of the pair, each said gauge being oriented to measure strains in shear in said gauging portion.

7. A cantilever beam shear load cell for measuring the magnitude of an applied load comprising, integrally, a loading portion to which the load is applied, a support portion adapted for engaging an adjacent member on which the load cell may be cantilever mounted, and a thinner intermediate gauging portion,
 said loading portion and support portion including respectively a loading area and a parallel longitudinally spaced support area, said loading area including a pair of spaced, transverse loading ridges, said support area including a pair of spaced, transverse support ridges and means closely adjacent said support ridges for securing said load cell to said adjacent member, and said gauging portion including a pair of shear surfaces perpendicular to said areas.

8. A cantilever beam shear load cell for measuring the magnitude of an applied load comprising, integrally, a loading portion to which the load is applied, a support portion adapted for engaging an adjacent member on which the load cell may be cantilever mounted, and a thinner intermediate gauging portion, said loading portion and support portion including respectively a loading area and a parallel longitudinally spaced support area, said loading area including a pair of spaced, transverse loading ridges, said support area including a pair of spaced, transverse support ridges and means closely adjacent said support ridges for securing said load cell to said adjacent member, and said gauging portion including a pair of planar shear surfaces defined by portions of external opposite surfaces of said beam perpendicular to said areas.

9. A cantilever beam shear load cell for measuring the magnitude of an applied load comprising, integrally, a loading portion to which the load is applied, a support portion adapted for engaging an adjacent member on which the load cell may be cantilever mounted, and a thinner intermediate gauging portion, said loading portion and support portion including respectively a loading area and a parallel longitudinally spaced support area, said loading area including a pair of spaced, transverse loading ridges, said support area including a pair of spaced, transverse support ridges and means closely adjacent said support ridges for securing said load cell to said adjacent member, said gauging portion including a pair of planar shear surfaces defined by portions of external opposite surfaces of said beam perpendicular to said areas and a cylindrical cavity extending through said gauging portion intermediate said shear surfaces with the central axis of said cavity perpendicular to said areas, and a strain gauge bonded to each of said shear surfaces at said gauge and oriented to measure strains in shear in said gauging portion.

10. A shear load cell for measuring the magnitude of an applied load comprising, in combination:

a cantilever beam with, integrally, a loading portion to which the load is applied, a support portion adapted for engaging an adjacent member on which the load cell may be cantilever mounted, and a thinner intermediate gauging portion, said loading portion and support portion including respectively a longitudinally spaced loading area and a parallel oppositely facing support area, said loading area including a pair of spaced transverse loading ridges, said support area including a pair of spaced, transverse support ridges and means closely adjacent said support ridges for securing said load cell to said adjacent member, said gauging portion including a pair of planar shear surfaces defined by external opposite surfaces of said beam perpendicular to said areas, and a strain gauge bonded to each of said shear surfaces at said gauge being oriented to measure strains in shear in said gauging portion.

11. A shear load cell for measuring the magnitude of an applied load comprising, in combination:

a cantilever beam with, integrally, a loading portion to which the load is applied, a support portion adapted for engaging an adjacent member on which the load cell may be cantilever mounted, and a thinner intermediate gauging portion, a substantially cylindrical cavity extending through said gauging portion intermediate shear surfaces thereof with the central axis of said cavity perpendicular to said shear surfaces, said loading portion and support portion including respectively a longitudinally spaced loading area and a parallel oppositely facing support area, said loading area including a pair of spaced, transverse loading ridges, said support area including a pair of spaced, transverse support ridges and means closely adjacent said support ridges for securing said load cell to said adjacent member, and a pair of strain gauges bonded to each of said shear surfaces at equal distances above and below the neutral axis of the beam with strain sensitive resistance filaments of one of the pair at a 45° angle to the neutral axis and perpendicular to strain sensitive resistance filaments of the other of the pair.

12. A shear load cell for measuring the magnitude of an applied load comprising, in combination:

a cantilever beam with, integrally, a loading portion to which the load is applied, a support portion adapted for engaging an adjacent member on which the load cell may be cantilever mounted, and a thinner intermediate gauging portion, a substantially cylindrical cavity extending through said gauging portion intermediate shear surfaces thereof with the central axis of said cavity perpendicular to said shear surfaces, said loading portion and support portion including respectively a longitudinally spaced loading area and a parallel oppositely facing support area, and a pair of strain gauges bonded to each of said shear surfaces at equal distances above and below the neutral axis of the beam with strain sensitive resistance filaments of one of the pair at a 45° angle to the neutral axis and perpendicular to strain sensitive resistance filaments of the other of the pair.

References Cited by the Examiner

UNITED STATES PATENTS

| 2,597,751 | 5/1952 | Ruge | 338—5 |
| 2,722,587 | 11/1955 | Buzzetti et al. | 338—2 |
| 3,024,648 | 3/1962 | Webster | 73—141 |
| 3,037,178 | 5/1962 | Pien | 73—88.5 X |
| 3,195,353 | 7/1965 | Pien | 338—4 X |
| 3,196,676 | 7/1965 | Pien | 73—141 |
| 3,205,706 | 9/1965 | Tracy | 73—88.5 X |

RICHARD M. WOOD, *Primary Examiner.*

W. D. BROOKS, *Assistant Examiner.*